United States Patent [19]

Bartels

[11] 4,227,596
[45] Oct. 14, 1980

[54] CONTACT DEVICE

[75] Inventor: Willem Bartels, Daarle, Netherlands

[73] Assignee: Hazemeijer B.V., Netherlands

[21] Appl. No.: 913,470

[22] Filed: Jun. 7, 1978

[30] Foreign Application Priority Data

Jun. 8, 1977 [NL] Netherlands .................... 7706308

[51] Int. Cl.³ ............................................. B60M 1/34
[52] U.S. Cl. ................................. 191/23 A; 191/59.1
[58] Field of Search .............. 191/45 R, 59.1, 23 A; 200/154, 155, 156, 160

[56] References Cited

U.S. PATENT DOCUMENTS 3,749,858  7/1973  Payen ........................... 191/45 R
4,106,600  8/1978  Mirirogi ....................... 191/59.1

Primary Examiner—Richard A. Schacher
Attorney, Agent, or Firm—Watson, Cole, Grindle & Watson

[57] ABSTRACT

A contact device for interconnecting an electrically energized rail with a removable contact finger mounted on a movable vehicle includes a hollow housing and two cooperating contact members therein, the contact members being mounted in a hinge-like fashion so as to be mirror images of one another, one set of cooperating ends contacting the removable contact finger and the other set of cooperating ends contacting the insides of the spaced-apart walls forming the rail.

7 Claims, 2 Drawing Figures

_4,227,596_

CONTACT DEVICE

BACKGROUND OF THE INVENTION

1. Field of the Invention

The invention relates to a contact device which provides for self-adjusting contact with a removable contact finger of a distribution installation, the contact device being used for making electrical contact between the removable contact finger and either two by two, somewhat spaced-apart, electrically energized parallel running rails, or at least one grooved rail which is provided with parallel running, spaced-apart walls, the contact device intended for feeding electrical current between the rails and the removable contact finger.

2. The Prior Art

A contact device of the type herein contemplated is known, e.g. as discussed in a pamphlet of De Hoop/Groenpol Industrie Rotterdam B.V. With this known contact device the removable contact fingers extending from the back side of a removable block are provided with strip-shaped contact members which are bent in a U-shape configuration around these contact fingers, the contact members being both mechanically and electrically connected to the contact fingers by means of a bolt connection. The U-shaped contact member is shaped such that the closed side of the U-shape is not completely circular but is tapered somewhat to the centre such that the insertion of the contact device into the spacing between the rails is made easier. Further, the inner sides of the upstanding legs of the U-shape do not directly engage with the contact finger over their entire length but at both sides of the contact finger some space is left between this contact finger and the legs of the U-shape over a portion of the length of the upstanding legs. In addition, the distance measured over the outside of the upstanding legs of the U-shape is larger than the spacing between the rails into which the contact has to be pressed.

In this manner the required contact pressure is obtained by the elasticity of the U-shaped contact member. The advantage of such a contact device is that parts of the distribution installation can be altered or replaced in a simple and quick way without much work break-interruption.

An important disadvantage of the mentioned contact device, however, is that in case of a heavily increasing current, in particular a short circuit current, the contact pressure can be decreased such that an interruption with arc discharge occurs, during which the contacts may be welded together. When such welding occurs, the rails may be damaged such that a long breakdown may be caused due to the need for replacement of the damaged feeding rails. The reduction in the contact pressure is caused by the parallel flowing currents in the legs of the U-shaped contact member by which a force is generated which draws the legs towards each other. A further disadvantage of the known device is that although a good centering of the removable contact fingers with respect to the spacing between the rails is very important for establishing a good contact, in the case of a deviation from the necessary centered position of the contact fingers, the legs of the U-shaped contact member can be pressed sideways against the adjacent rails with different contact pressure on the two rails, resulting, in the most unfavorable case, in a loss of contact between one leg and one rail. Obviously this constitutes a contact of bad quality.

Accordingly it is an object of the present invention to provide a contact device in which the noted disadvantages are eliminated and in which the contact pressure is increased by the current flowing through the contact device, whilst the contact quality remains independent of the centered position of the contact finger between the rails.

SUMMARY OF THE INVENTION

According to the present invention a contact device of the above mentioned kind is constructed such that the contact device consists of a housing and at least two cooperating contact members which are made of strip-shaped material are incorporated in the housing, each of the contact members comprising a comparative short section, a comparative long section positioned in a different plane than that generally defined by the comparative short section located and a curved section between the comparative short section and the comparative long section, each contact member being constructed in such a way that after assembling, the contact members will cross each other at their curved sections to form a hinge, the comparative short section of one contact member lying substantially in alignment with the comparative long section of the other contact member, and the opposite positioned sides of the comparative long sections serving to contact the removable contact fingers while the sides of the comparative short sections, which are directed away from each other, will serve to contact the rails. Biasing means are used to provide a sufficient contact force.

The noted problem of welding can be prevented still further by shaping the contact members so that each contact device contacts the rail at two points and contacts the removable contact finger at one point. In view of the fact that the allowable current is not proportional to the contact force, a higher current is allowed at the spot of the contact with the rail by dividing the same contact force over two points than at the spot of the contact with the removable contact finger, such that a welding, if any, will take place at the side of the removable contact finger, which results in less of a disadvantageous breakdown.

The contact device according to the invention can be mounted with its housing at any desired place along the rails, so that a branching can be provided at any place along the rail.

A preferred solution, however, is to connect the contact device to a contact support partition which is mounted in the rail board before the rail. By this procedure the contact devices for a given removable contact finger need not be individually adjusted to this contact finger. To make the contact device suitable for a given intensity of current one may apply either a broader contact member or several contact members with equal width next to each other.

For an appropriate manufacturing and storing, a number of contact members with the same width are preferably used because one can then start from a standard housing which is suitable for several sets of contact members. According to need, one or more sets of contact members can be mounted in that housing. In addition, one can use the same strip for the fabrication of the contact members.

In a preferred embodiment of the contact device according to the invention the contact members are of the same form, each being provided with a slot in the curved section so that the contact members can be inserted into each other to form a hinge. In this way the width defined by the assembled contact members is not greater than the width of one single contact member.

By constructing the contact members in this way they can have exactly the same shape, which is advantageous for keeping them in stock and for fabricating them.

The necessary sufficient contact pressure can be obtained as well by means of one or more draw springs, or by one or more plate springs, or by means of one or more compression springs.

The invention will now be further described by reference to the accompanying drawing.

DESCRIPTION OF THE PREFERRED EMBODIMENT

Figure 1:
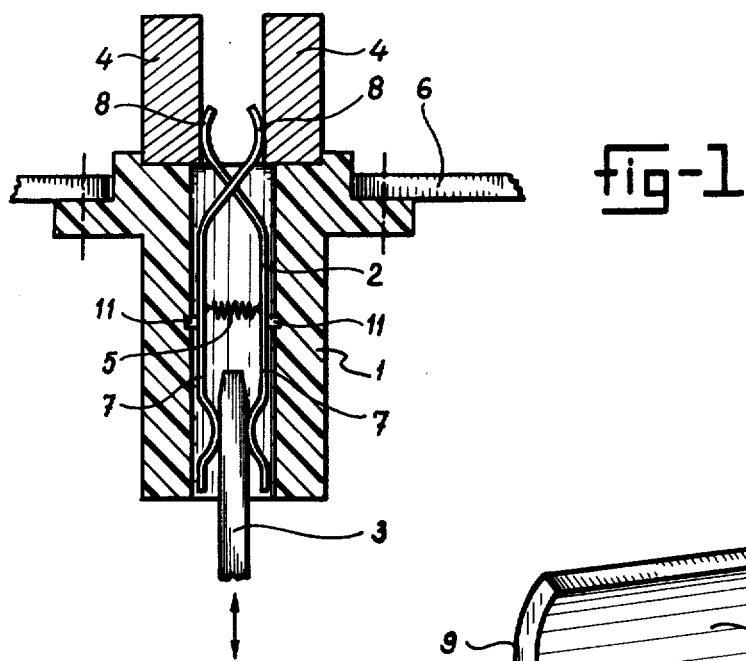
FIG. 1 shows a longitudinal section of the contact device according to the invention.

In FIG. 1 a housing 1 is shown which includes a hollow portion in which are mounted the cooperating contact members 2. The housing is connected to a panel by means of a contact support partition 6 so that the comparative short sections 8 of the contact members 2, extending from the front side of the housing 1, engage the inner sides of the spaced-apart, parallel rail walls 4. The contact with the removable contact fingers 3 which extend from a block connected to, e.g., to the power lines can be achieved by inserting the contact fingers between the comparative long sections 7 of the contact members 2.

By means of a spring 5 a sufficient contact force can be applied to clamp the contact fingers between the contact members. As shown, the spring 5 can be formed by a draw spring. It is, however, also possible to obtain the contact force by means of plate springs or compression springs. On the other hand, the comparative long sections of the contact members can be bent towards each other so that they provide the spring contact pressure themselves.

As shown in FIG. 1 the long sections of both contact members 2 extend in a parallel fashion over a great portion of their length. When a current flows from the rails 4 to the contact fingers 3 via the contact members 2 then this current will divide itself into two equal currents passing through the cooperating contact members 2. Because these currents will flow in the same direction, the contact members 2 will be drawn towards each other such that the contact force will be increased between the rails 4 and the short sections 8 of the contact members 2, as well as between the long sections of the contact members 2 and the contact fingers 3. To intensify the effect of this contact force-increasing action, the contact members 2 can be positioned very close alongside of each other over a great part of their length.

Figure 2:
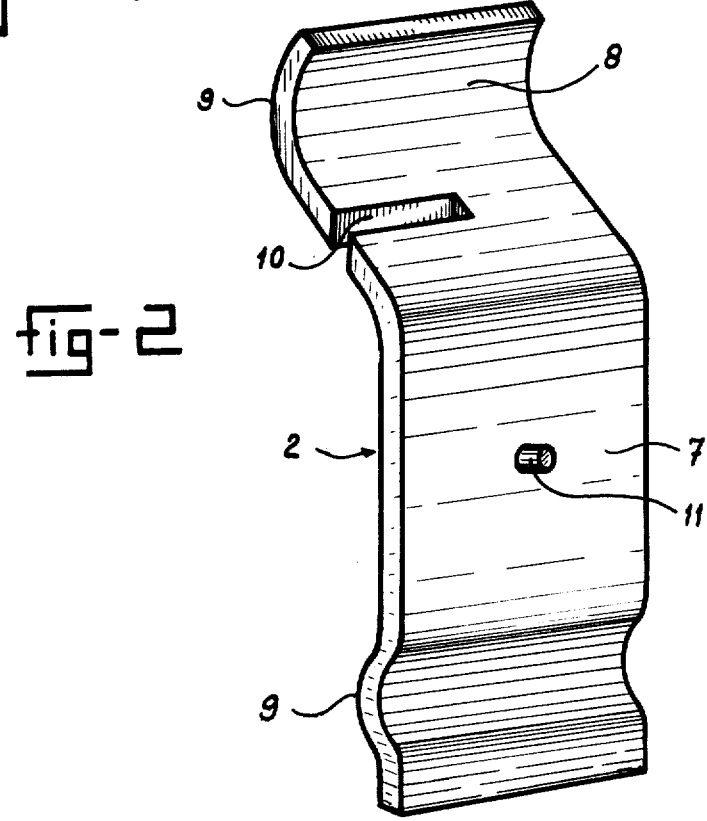
FIG. 2 shows a perspective view of a single contact member used in the contact device according to the invention.

In FIG. 2 a possible embodiment of a contact member 2 is shown. As appears from this FIG. 2 the comparative long section 7 as well as the comparative short section 8 of the contact member 2 are provided with spherically bent surfaces 9. These bent surfaces 9 provide for a good contact even when the parts involved in the contact display manufacturing irregularities.

FIG. 2 also shows that the contact members 2 are provided with a slot 10, such that these contact members 2 can be inserted into each other. For such purpose the opposite contact member 2, which completely corresponds with the contact member 2 (is mirror symmetrically shaped) shown in FIG. 2, is turned over 180° with respect to the shown contact member 2, such that both slots 10 are positioned opposite each other and can be inserted into each other to form a hinge connection.

Finally, FIG. 2 indicates that by means of a pin 11 the contact members 2 can be prevented from falling out of the housing 1, i.e., the pin 11 is inserted into a bore provided in the housing 1 as shown in FIG. 1.

I claim:

1. A contact device for electrically contacting a removable contact finger with two electrically energized spaced-apart, parallel rail walls, said contact device comprising a housing having a hollow portion therein, at least two contact members mounted within the hollow portion of said housing, each contact member comprising a long section, a short section and an interconnecting intermediate curved section setting off the short section with respect to the long section, two contact members being mounted within said hollow portion of said housing such that they cross each other at their intermediate curved sections to form a hinge-like connection, and such that the short section of one contact member is positioned substantially in alignment with the long section of the other contact member, and also such that the short and long sections of one contact member will run substantially parallel with the short and long sections of the other contact member, the internal opposite sides of the long sections of the contact members forming the means for contacting the removable contact finger while the external sides of the short sections of the contact members, which extend outwardly of said housing, form the means for contacting the inner sides of the respective rail walls, and a biasing means connected between the long sections of two contact members for providing a contact pressure between the contact areas of said contact members and both the contact finger and the rail walls.

2. The contact device of claim 1 wherein the short section of each contact member is in the form of a spherically bent surface, wherein the long section of each contact member includes a spherically bent portion, wherein the spherically bent surface and the spherically bent portion of each contact member is curved on the same side of the contact member, wherein the cooperating contact members are mounted such that the spherically bent surfaces and spherically bent portions of two cooperating contact members are mirror images of one another, and wherein said spherically bent surfaces respectively contact the inner sides of the respective rail walls and the spherically bent portions contact the removable contact finger.

3. The contact device of claim 2 wherein each intermediate curved section of each contact member includes a slot allowing for the contact members to form therebetween a hinge-like connection.

4. The contact device of claim 1 wherein a contact support partition is attached to said housing for mounting said housing on a rail panel.

5. The contact device of claim 1 wherein said housing is shaped to be directly mountable on said rail walls.

6. The contact device of claim 1 wherein said long sections of said contact members include pins, wherein said housing has bores in the walls thereof enclosing said hollow portion, and wherein said pins fit within said bores to prevent said contact members from falling out of said housing.

7. The contact device of claim 1 wherein the external sides of the short sections of each of the contact members is shaped so as to contact the inner sides of the respective rail walls at two points and wherein the internal opposite side of the long sections of each of the contact members is shaped so as to contact the removable contact finger at one point.

* * * * *